United States Patent [19]

Beckerleg et al.

[11] Patent Number: 4,690,351

[45] Date of Patent: Sep. 1, 1987

[54] INFRARED SEEKER

[75] Inventors: Richard A. Beckerleg, Boxford, Mass.; Mark R. Fernald, Amherst, N.H.; Richard R. LaTorre, Bedford; Vincent A. Grosso, Hopkinton, both of Mass.

[73] Assignee: Raytheon Company, Lexington, Mass.

[21] Appl. No.: 828,413

[22] Filed: Feb. 11, 1986

[51] Int. Cl.4 .............................................. F41G 7/26
[52] U.S. Cl. ................................................... 244/3.16
[58] Field of Search ....................................... 244/3.16

[56] References Cited

U.S. PATENT DOCUMENTS 4,034,949  7/1977  Hoesterey et al. ................. 244/3.16
4,326,799  4/1982  Keene et al. ....................... 244/3.16
4,347,996  1/1982  Grosso .............................. 244/3.16

FOREIGN PATENT DOCUMENTS

WO83/00382  2/1983  PCT Int'l Appl. ................ 244/3.16

Primary Examiner—Charles T. Jordan
Attorney, Agent, or Firm—Philip J. McFarland; Richard M. Sharkansky

[57] ABSTRACT

An infrared seeker for use in a spinning projectile is shown to include a Cassegrainian telescope having a tapered optical wedge overlying the entrance aperture, such wedge being rotatably mounted to allow scanning and tracking, and a jettisonable streamlined cover overlying the optical wedge to reduce drag so long as such cover is in place.

2 Claims, 2 Drawing Figures

INFRARED SEEKER

BACKGROUND OF THE INVENTION

This invention pertains generally to infrared (IR) seekers, and particularly to a high g hardened, strapped-down seeker intended for use as the sensor in a cannon-launched spin-stabilized guided projectile.

A guidance system for a spinning projectile is described in U.S. Pat. No. 4,347,996 issued Sept. 7, 1982 to V. A. Grosso and assigned to the same assignee as this application.

As is known, IR seekers have been extensively utilized in such applications as air-to-air missiles and anti-armor submunitions. IR seekers, however, have not found broad application as the sensors for cannon-launched projectiles because of the difficulty inherent in withstanding the "high g" environment, usually around 17,000 g's, experienced with a cannon launch. The problem of g-hardening the IR seeker is two-fold in that both the gimbal system for the optical telescope and the IR dome must survive the high g environment. A first approach to g-hardening the gimbal system utilizes a mechanism for restraining the gimbal system during launch and releasing the gimbal system after launch. This approach is relatively complex, expensive and of questionable reliability. A second approach to g-hardening the gimbal system utilizes a gimbal system in the form of an optical-free gyroscope supported on a non-compliant lined spherical gas bearing. While this design has survived a launch environment on the order of 10,000 g's, further refinements and improvements are required to enable this design to withstand a 17,000 g load.

Generally, for optical considerations a hemispherical IR dome is utilized on IR seekers and the g-hardening of such domes to withstand the anticipated launch environment has proven to be a difficult task.

SUMMARY OF THE INVENTION

With the foregoing background of the invention in mind, it is a primary object of this invention to provide a g-hardened IR seeker for a spin-stabilized projectile wherein the optical system is hard-mounted (strapped down) to the body of the projectile and the gyroscopic characteristics of the spin-stabilized projectile are used to provide an inertially-stabilized line-of-sight in pitch and yaw for the IR seeker.

It is another object of this invention to provide a g-hardened IR seeker for a spin-stabilized projectile wherein the conventional hemispherical IR dome and two axis gimbal is replaced by a rotating germanium optical wedge to provide both dome and gimbal functions.

These and other objects of this invention are generally attained by providing a strapped-down IR seeker comprising a catadioptric optical telescope that is fixed to the body of the projectile but whose optical axis is inclined at an angle; e.g. 6°, with respect to the centerline of the projectile. The spin of the projectile is utilized to scan an annular ring of the target area. The optical wedge (a small angle prism) serves as the IR dome during the terminal phase of flight. The wedge is rotated ±90° about the projectile spin axis to steer the seeker line-of-sight, LOS, radially from the projectile centerline to twice the fixed off-axis optical angle: eg., 12°. The steering by wedge rotation performs the gimbal function. Thus, the projectile spin motion scans a circular annular pattern and the radius of the pattern is varied by controlling the position of the rotating optical wedge. The resultant pattern for discrete wedge rotation angles is a series of concentric annuli. For linear wedge rotation a spiral search pattern is generated.

The position of the servo in the wedge is controlled by a data processor. The processor first generates the seeker search commands. Once a target is detected, the wedge position is commanded to the next expected radial position and a track mode commences. In the track mode, target line-of-sight measurements are made by differencing sequential line-of-sight positions to generate line-of-sight rate output for the target.

To provide adequate optical wedge strength during high G induced loads, the wedge is prestressed by a metal band or ring. A controlled shrink fit method of application is used.

The steering of the LOS by the wedge allows a light weight and small field of view telescope to be used to cover the complete search and track area. Only a few optical infrared detectors are required. The instantaneous field of view of the detectors is only one ten-thousandth of the solid angle searched.

BRIEF DESCRIPTION OF THE DRAWINGS

For a more complete understanding of this invention, reference is now made to the following description of the accompanying drawings wherein.

DESCRIPTION OF THE PREFERRED EMBODIMENT

Figure 1:
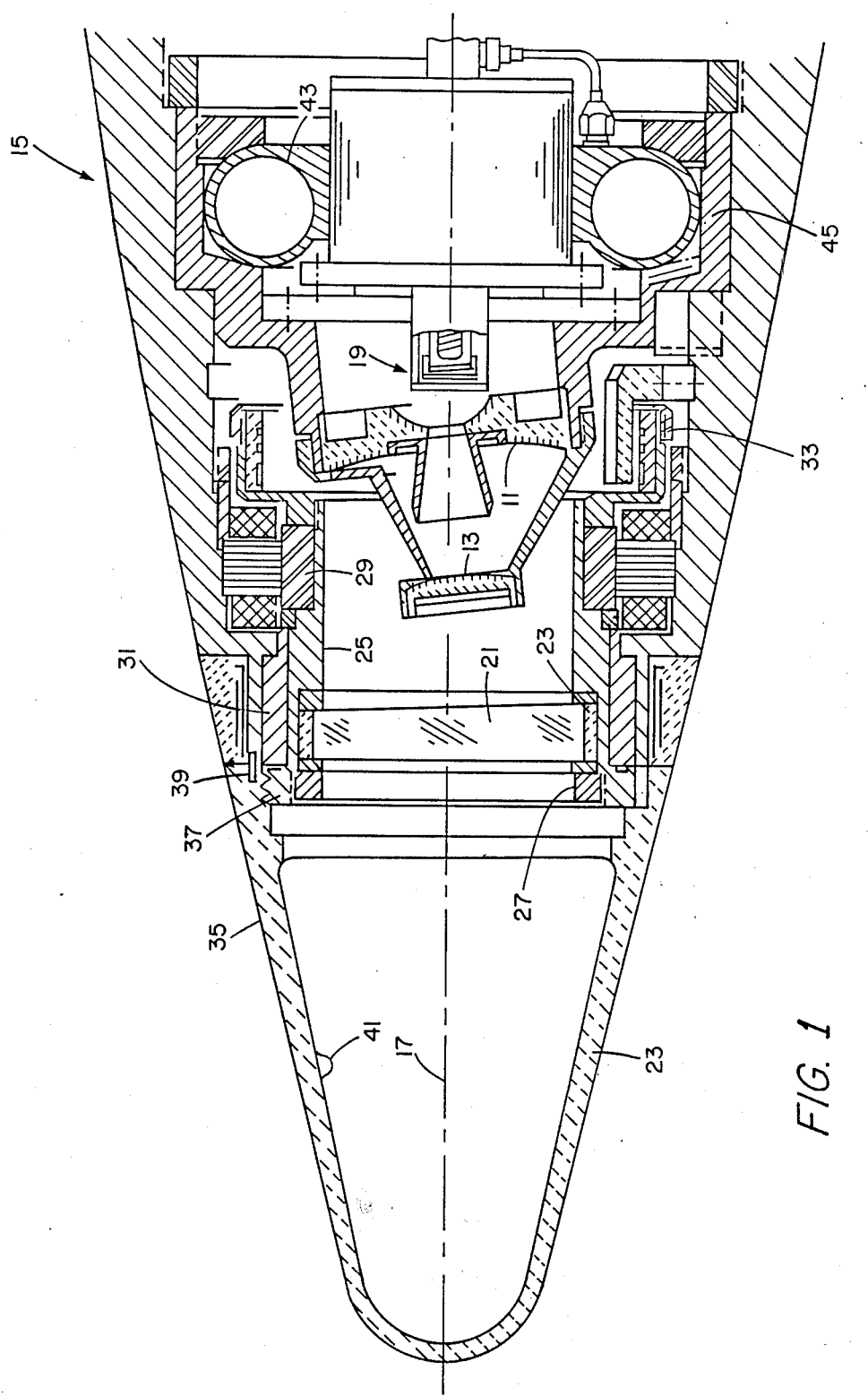
FIG. 1 is a cross-sectional view of a strapped-down IR seeker according to this invention.

Referring now to FIG. 1, a strapped-down IR seeker according to this invention includes a Cassegrainian-type telescope (not numbered) comprising a primary mirror 11 and a secondary mirror 13. The telescope (not numbered) is fixed to the body of the projectile 15 with its optical axis here being tilted 6° from the centerline 17 of the projectile 15. IR radiation received by the telescope (not numbered) is reflected off the primary and secondary mirrors 11 and 13 respectively to IR detectors (not shown, but here two, eight-element linear arrays of detectors) within a cryogenically-cooled detector assembly 19. A first one of the linear arrays of detectors is responsive to IR radiation in the midband and the second array of detectors is responsive to IR radiation in the far band.

The IR seeker uses the spin motion of the projectile 15 to scan a circular pattern. The radius of the scan pattern is controlled by rotating an optical wedge 21. In addition to steering the line-of-sight (LOS) of the IR seeker and providing the gimbal function, the optical wedge 21 serves as an IR window, replacing the conventional hemispherical IR dome which, as mentioned hereinabove, is difficult to g-harden.

The optical wedge 21 is fabricated from germanium in order to avoid excessive chromatic aberration in the two-color IR seeker. The relatively high index of refraction of germanium permits the design of a practical wedge having a small wedge angle, here 1°45′7″. The optical wedge 21 is pre-stressed and within a Kovar metal rim 23 so that such wedge is under compression. The coefficient of thermal expansion of the Kovar metal rim 23 is closely matched to that of the germanium wedge 21. The pre-stressing places the complete wedge compression. No portion of the optical wedge is ever in tension (where it is weak mechanically) during high G loading. The wedge 21 and the Kovar ring 23 are affixed to a cylindrical member 25 by means of a threaded ring 27. The cylindrical member 25 is connected to the rotor 29 of a DC servo motor (not numbered) and is rotatably supported within the projectile 15 by means of a journal bearing 31. A slip ring potentiometer 33 is provided to measure the position of the optical wedge 21 with respect to the body of the projectile 15. The DC servo motor (not numbered) is effective to rotate the optical wedge 21 about the spin axis of the projectile 15 and thereby steer the LOS radially from the projected centerline 17 to a point 12° off axis.

Completing the IR seeker is an ejectable nose cone 35 attached, in a manner to be described, to the front end of the projectile 15. The nose cone 35 is a light weight aluminum cone that provides a low drag configuration while protecting the IR telescope (not numbered) and the optical wedge 21 until the terminal phase of flight. The nose cone 35 is held on the projectile 15 during launch by means of an interrupted thread arrangement 37 provided on the cylindrical member 25 and a detent pin 39. Just prior to the start of the seeker search mode the cylindrical member 25 is rotated by the DC servo motor (not numbered) in response to a command supplied by a digital data processor (not shown) in order to disengage the interrupted thread arrangement 37. A small mass unbalance 41 provided on the inner wall of the nose cone 35 will then be effective, by means of centrifugal force, to separate the nose cone 35 from the body of the spinning projectile 15. After ejection of the nose cone 35 the projectile 15 will provide a flat front surface to the airstream that will not adversely affect the stability of the projectile 15 during the remainder of the flight.

Finally, within the IR telescope (not numbered) high pressure nitrogen for the cryogenically cooled detector assembly 19 is stored in an annular gas storage bottle 43. Packaged within the telescope housing 45 and disposed within the annular gas storage bottle 43 are the detector preamplifiers (not shown), the output signals from which are passed to the seeker electronics unit (FIG. 2).

Figure 2:
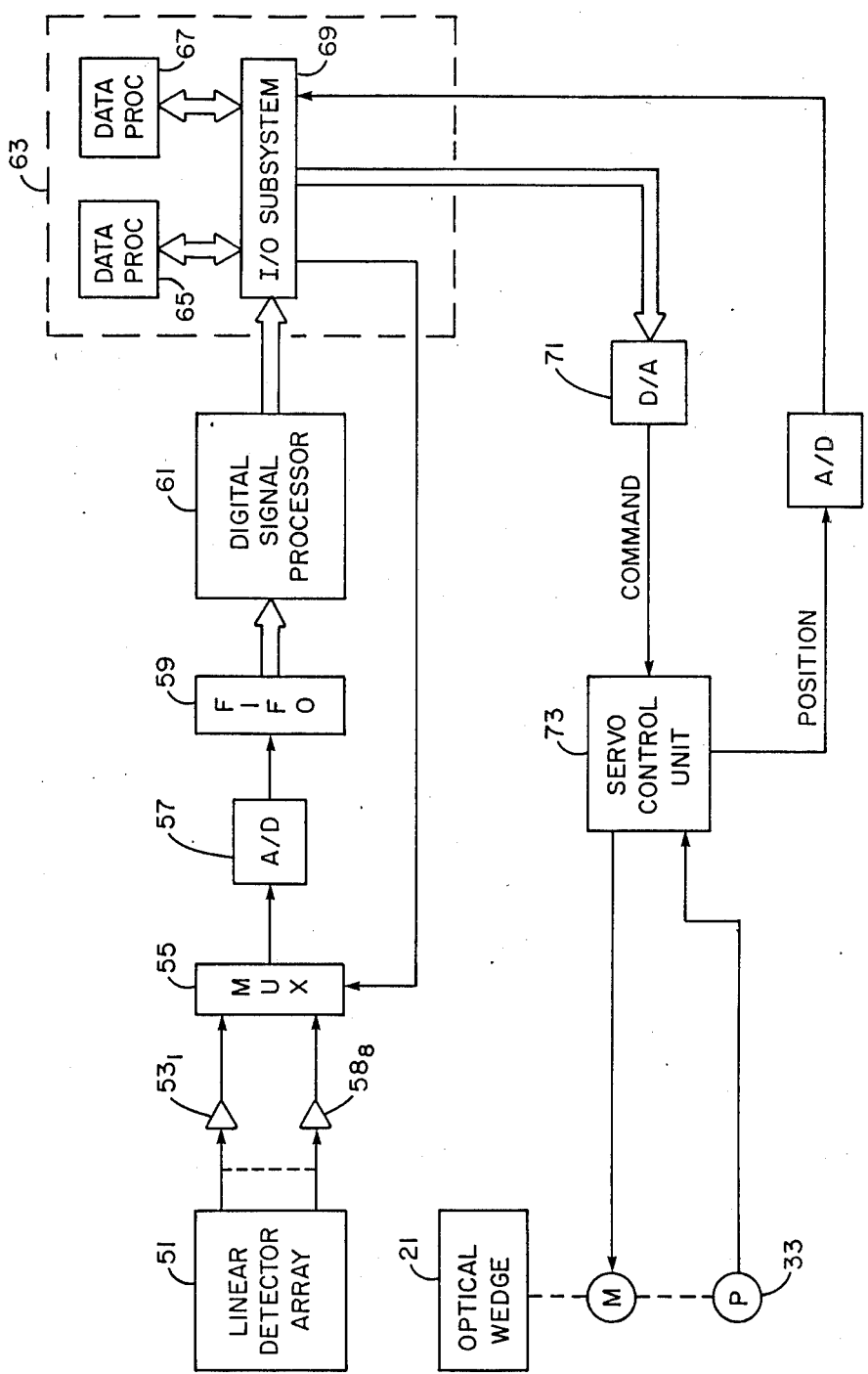
FIG. 2 is a simplified block diagram of the signal processing electronics of the strapped-down seeker of FIG. 1.

Referring now to FIG. 2, the contemplated seeker signal processing technique will be explained. For ease of exposition, only one linear detector array is shown; however, it should be appreciated that the signal processing for the other linear detector array is identical to that to be described. Thus, the output signals from each of the detectors in the linear detector array 51 are amplified in amplifiers $53_1 \ldots 53_8$ and the amplified output signals from the latter are passed to a multiplexer 55 for time-multiplexing a single channel in response to a control signal provided by a digital data processor 63. The multiplexed data from the multiplexer 55 are digitized in an analog-to-digital converter 57 and are then passed to a first-in, first-out (FIFO) memory 59 to more uniformly spread the processing time. Multiple scans may be used to complete each search radius by processing data out of the FIFO and gathering new data on the next scan over the target area at the same radial angle. The FIFO trades data storage capacity and speed of processing for search time.

Digressing briefly here now for a moment it should be recalled that the IR seeker 10 (FIG. 1) utilizes the spin of the projectile 15 (FIG. 1) to scan an annular pattern and that the radius of that pattern is controlled by rotating the optical wedge 21. The resulting pattern is either a series of concentric annuli or a spiral which, when taken together, completely cover a field encompassed by a 12° included half angle. The detector data bandwidth varies as a function of the search radius. In order to resolve to the 1.5 milliradian resolution of the detector elements (not shown) more data samples at the outer edge of the search field are required than are required at the inner edge of the field. The FIFO 59 is provided to supply the detector data to a digital signal processor 61 at a fixed slower rate more indicative of track LOS angles than search angles.

The digital signal processor 61 is of conventional design and includes a series of high and low pass digital filters and comparators that are effective to apply spatial, spectral and amplitude discriminants to the input data in order to separate armored targets from clutter and countermeasures. The output data from the digital signal processor 61 are passed to a digital data processor 63 for final target detection, track and guidance processing. The digital data processor 63 is a high speed parallel processing system comprising a pair of Zilog Z8002 microprocessors 65, 67 and an input/output (I/O) subsystem 69 comprising a direct memory address (DMA) controller, chip select decoders, common I/O arbitration logic, wait state logic and other random logic (none of which are shown) required by the microprocessors 65, 67.

As mentioned hereinabove, the digital data processor 63 generates, inter alia, the search commands for the optical wedge 21 (FIG. 1). Such commands are passed, via a digital-to-analog (D/A) converter 71 and a servo control unit 73 to the servo motor (not numbered) that controls the position of the optical wedge 21. Wedge position data measured by the slip ring potentiometer 33 are passed, via the servo control unit 73 and an A/D converter, to the digital data processor 63. When a valid target is detected, the mode of the IR seeker is changed from search to acquisition and the wedge 21 is commanded to the next expected radial target position. Once a target is confirmed an electronic "gate" is placed about the target's expected position in radial and azimuthal position and the track mode commences. During track the digital data processor 63 computes the target LOS by measuring the target position using the detector number, scan angle and wedge position data. Scan angle is measured using a coriolis oscillator and computer. LOS rate outputs are then generated by differentiating the position measurement.

Having described a preferred embodiment of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. For use in a spinning projectile, an infrared seeker comprising:
    (a) an optical wedge fabricated from germanium and prestressed, such wedge serving as the entrance of a Cassegranian telescope having a small field of view;
    (b) means for rotatably mounting the optical wedge about the longitudinal axis of such telescope to provide the gimbal function for the Cassegranian telescope; and (c) means for producing a signal indicative of the orientation of the optical wedge with respect to the longitudinal axis which, when combined with an on-board spin timing measurement and I.R. detector output properly signal processed, will supply, in inertial coordinates, the time rate of change of the target's angular position without regard to the projectile's angular or positional motion to guide to intercept with the target.

2. An infrared seeker as in claim 1 having, additionally, a housing shaped as an ogive overlying the optical wedge and means for jettisoning such housing.

* * * * *